(12) United States Patent
Sitzler et al.

(10) Patent No.: US 6,375,399 B1
(45) Date of Patent: Apr. 23, 2002

(54) MOTOR-VEHICLE LOAD-RETAINING SYSTEM

(75) Inventors: Wolfgang Sitzler, Wuppertal; Peter Ledüc, Düsseldorf, both of (DE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 0 days.

(21) Appl. No.: 09/447,694

(22) Filed: Nov. 23, 1999

(30) Foreign Application Priority Data

Nov. 24, 1998 (DE) .......................................... 198 54 240

(51) Int. Cl.$^7$ .......................... B60P 1/64; B63B 25/00; B64C 1/22; B61D 45/00
(52) U.S. Cl. .......................... 410/77; 410/80; 224/275; 296/65.16
(58) Field of Search .............................. 410/34, 35, 77, 410/80; 224/275, 924, 917.5, 42.32, 42.33, 42.34; 296/65.16

(56) References Cited

U.S. PATENT DOCUMENTS

| | | | |
|---|---|---|---|
| 1,796,502 A | * | 3/1931 | Boucher |
| 3,132,781 A | * | 5/1964 | Poczatek |
| 4,020,986 A | * | 5/1977 | McAtee |
| 4,739,637 A | * | 4/1988 | Finkel et al. |
| 4,974,765 A | * | 12/1990 | Marchetto et al. |
| 5,788,310 A | * | 8/1998 | McKee |

FOREIGN PATENT DOCUMENTS

| | | |
|---|---|---|
| DE | 74 30 905 | 12/1975 |
| DE | 93 11 587 | 1/1995 |
| DE | 297 11 198 | 9/1997 |

* cited by examiner

Primary Examiner—Stephen T. Gordon
Assistant Examiner—Scott Carpenter
(74) Attorney, Agent, or Firm—Herbert Dubno; Andrew Wilford

(57) ABSTRACT

A motor vehicle having a freight compartment having a floor and a seat having a seat back with a rear seat-back surface movable between a vertical position and a horizontal position, a load-retaining system has arrays of mounting formations on the floor and seat back. The formations of the arrays all are identically spaced within the respective arrays. A mounting plate has a bottom face formed with a plurality of mounting formations engageable in the mounting formations of the arrays and spaced identically to the mounting formations of the arrays. The mounting plate further has a top face formed with an array of mounting formations spaced identically to the mounting formations of the arrays. A device plate has a bottom face formed with a plurality of mounting formations engageable in the mounting formations of the arrays and of the mounting plate top face and a top face. A freight-holding device is fixed to the top face of the device plate.

6 Claims, 7 Drawing Sheets

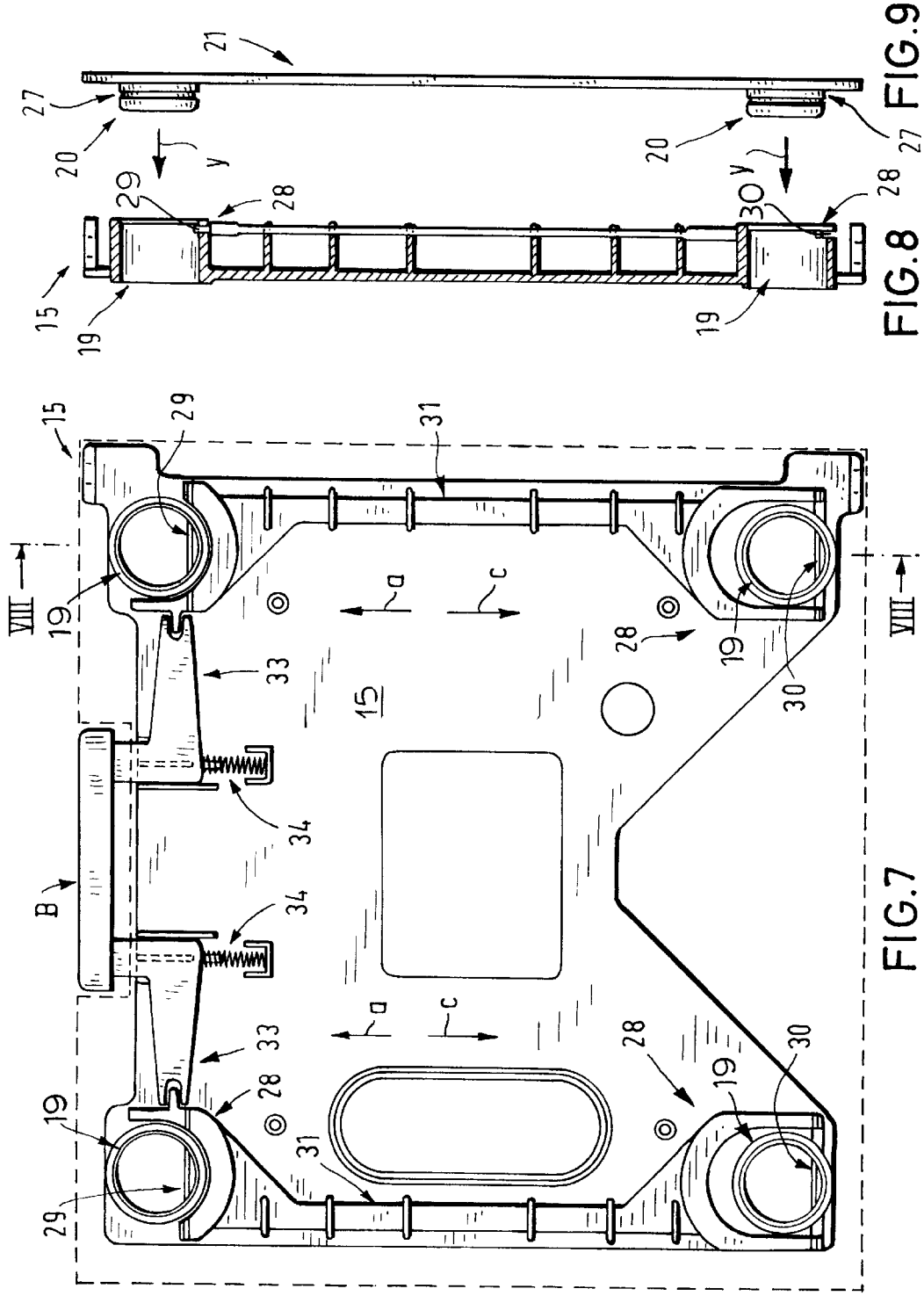

MOTOR-VEHICLE LOAD-RETAINING SYSTEM

FIELD OF THE INVENTION

The present invention relates to a load-retaining system for a motor vehicle. More particularly this invention concerns such a system used in a station wagon, van, limousine, or the like to prevent relatively large pieces of freight like luggage or skis from moving about in the vehicle.

BACKGROUND OF THE INVENTION

In German patent 195 13 215 of W. Sitzler a system is described for use in a motor vehicle having a seat back that can be moved from a vertical to a horizontal position. A mounting plate can be secured to the back of the seat when it is horizontal and in turn a special holding device, for instance for skis, can be mounted on it to allow a pair of skis to be solidly attached to the seat back so they do not move about in the vehicle when on the road. In another system a screen can have one end attached to a holding device secured to the holding plate and another edge secured in the vehicle to confine freight or pets in the back of the vehicle. To this end matable mounting formations are provided on the lower face of the mounting plate and on the upper face of the horizontal seat back, and further mounting formations are provided on the upper face of the mounting plate and on the device particularly fashioned to hold the freight in question.

The system of German utility model 93 11 587 is intended for use in a way-back compartment behind the rearmost seat. It has straps connected at front ends immediately behind the seat back and rear ends having clips that fit like a seat belt into fittings at the rear end or the compartment. Freight is secured underneath such belts which can be pulled tight to restrain the freight.

In German utility model 74 30 905 the entire floor of the luggage compartment is formed with a uniform array of upstanding pegs. Upstanding fittings can be clipped to these pegs at spacings set to confine a piece of freight. The system can be custom set for any particular size of object and will in effect form a good socket or seat for it.

In German utility model 297 11 198 a mounting plate is provided with complex clips that allow it to be mounted to and removed from a seat back. The mounting plate is adapted for many different functions and can carry a simple container, an end of a ski bag, or even a wall of a cooler.

OBJECTS OF THE INVENTION

It is therefore an object of the present invention to provide an improved motor-vehicle load-retaining system.

Another object is the provision of such an improved motor-vehicle load-retaining system which overcomes the above-given disadvantages, that is which allows a particular type of load-holding or -confining device to be mounted at any of a multiplicity of different locations in a motor vehicle.

SUMMARY OF THE INVENTION

A motor vehicle having a freight compartment having a floor and a seat having a seat back with a rear seat-back surface movable between a vertical position and a horizontal position, a load-retaining system has according to the invention arrays of mounting formations on the floor and seat back. The formations of the arrays all are identically spaced within the respective arrays. A mounting plate has a bottom face formed with a plurality of mounting formations engageable in the mounting formations of the arrays and spaced identically to the mounting formations of the arrays. The mounting plate further has a top face formed with an array of mounting formations spaced identically to the mounting formations of the arrays. A device plate has a bottom face formed with a plurality of mounting formations engageable in the mounting formations of the arrays and of the mounting plate top face and a top face. A freight-holding device is fixed to the top face of the device plate.

Thus with the system according to the invention the device plate and its associated freight-holding device can be mounted at any of a plurality of locations inside the vehicle. It can be installed on the floor or on the seat back, greatly increasing the versatility of the system.

Each array on the floor has a number of formations that is substantially greater than a number of the formations on the bottom face of the mounting plate. Thus the device plate can be moved about at least on the floor so it can be installed at any of several different locations.

The mounting formations on the bottom face of the device plate in accordance with the invention are spaced identically to the mounting formations of the arrays. Furthermore the device plate has a pair of hinged-together parts forming the respective bottom and top faces and pivotal relative to each other. Thus if the seat back does not go into a perfectly horizontal position, the part forming the top surface can be hinged up and locked in place so it is horizontal.

The seat back according to the invention is formed with a recess having a base surface provided with the respective mounting formations. In addition the mounting formations of the floor and seat back and of the bottom face of the mounting plate are different from the mounting formations of the top face of the mounting plate and bottom face of the device plate.

Some of the mounting formations according to the invention are formed as cylindrical sockets and others of the mounting formations are formed as complementary cylindrical pins. In addition the pins are each formed with an outwardly open notch. The system further has according to the invention retaining formations on at least one of the plates laterally engageable in the notches to hold the plates in position. These retaining formations are all coupled to a common locking assembly on the one plate for joint movement between locking positions engaged in the respective notches and freeing positions clear of the respective notches. Thus by moving the common locking assembly the device plate can be unlatched from the mounting plate or the mounting plate can be unlatched from the seat back or floor.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 7 is a back or top view of a mounting plate according to the invention;

FIG. 8 is a section taken along line VIII—VIII of FIG. 7; and

FIG. 9 is a side view through a device-carrying plate in accordance with the invention.

SPECIFIC DESCRIPTION

Figure 3:
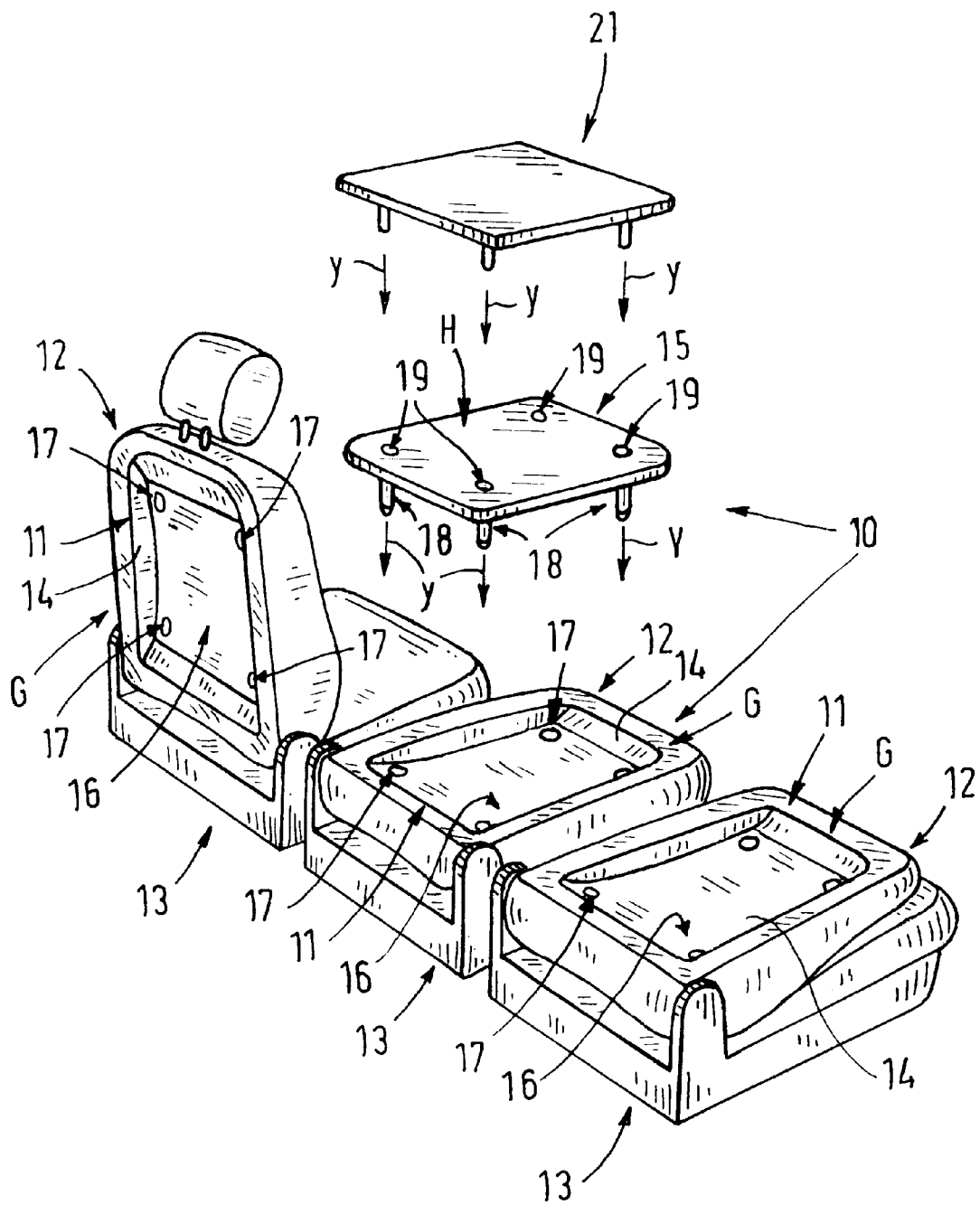

As seen in FIG. 3 a load-retaining system 10 according to the invention can be mounted on any of a plurality of mounting locations G on back faces 11 of seat backs 12 of three rear seats 13. Each seat back 12 is formed with a respective large recess 14 in which a respective mounting plate 15 is secured. Each recess 14 has a floor face 16 that is directed upward when the respective back 12 is down in its horizontal position and that is formed with four mounting formations 17, here constituted as pockets or sockets, in which are engaged complementary mounting formations 18, here pins, formed on the plate 15 so the plate 15 can be installed in any of the recesses 14 by movement in direction y. An outer or upper face H of the mounting plate 15 has four similar mounting formations 19 in which pin-like mounting formations 20 of a device plate 21 that can similarly be mounted on the plate 15 by insertion in the direction y. The formations 17, 18, 19, and 20 are distributed uniformly in a rectangular array.

Figure 1:
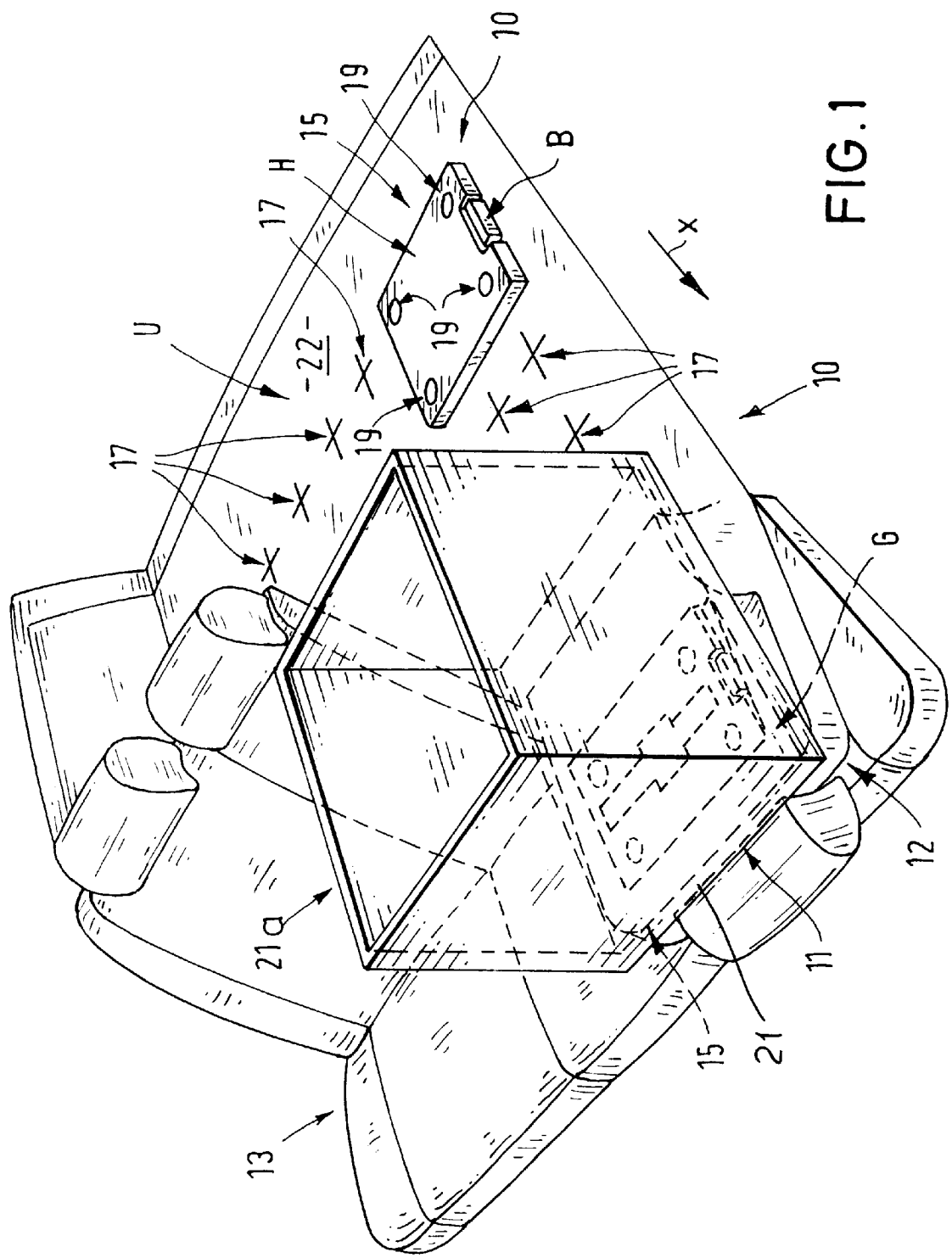
FIG. 1 is a perspective view of the system according to the invention.

FIG. 1 shows how the device plate 21 is a floor of a freight-holding box 21a. Here behind the seats 13 in the travel direction x is a storage compartment having a floor 22 also formed with a matching array of the formations 17 (indicated schematically). Thus the mounting plate 21 can also be mounted at any of a plurality of locations on the formations 17 of the floor 22.

Figure 2:
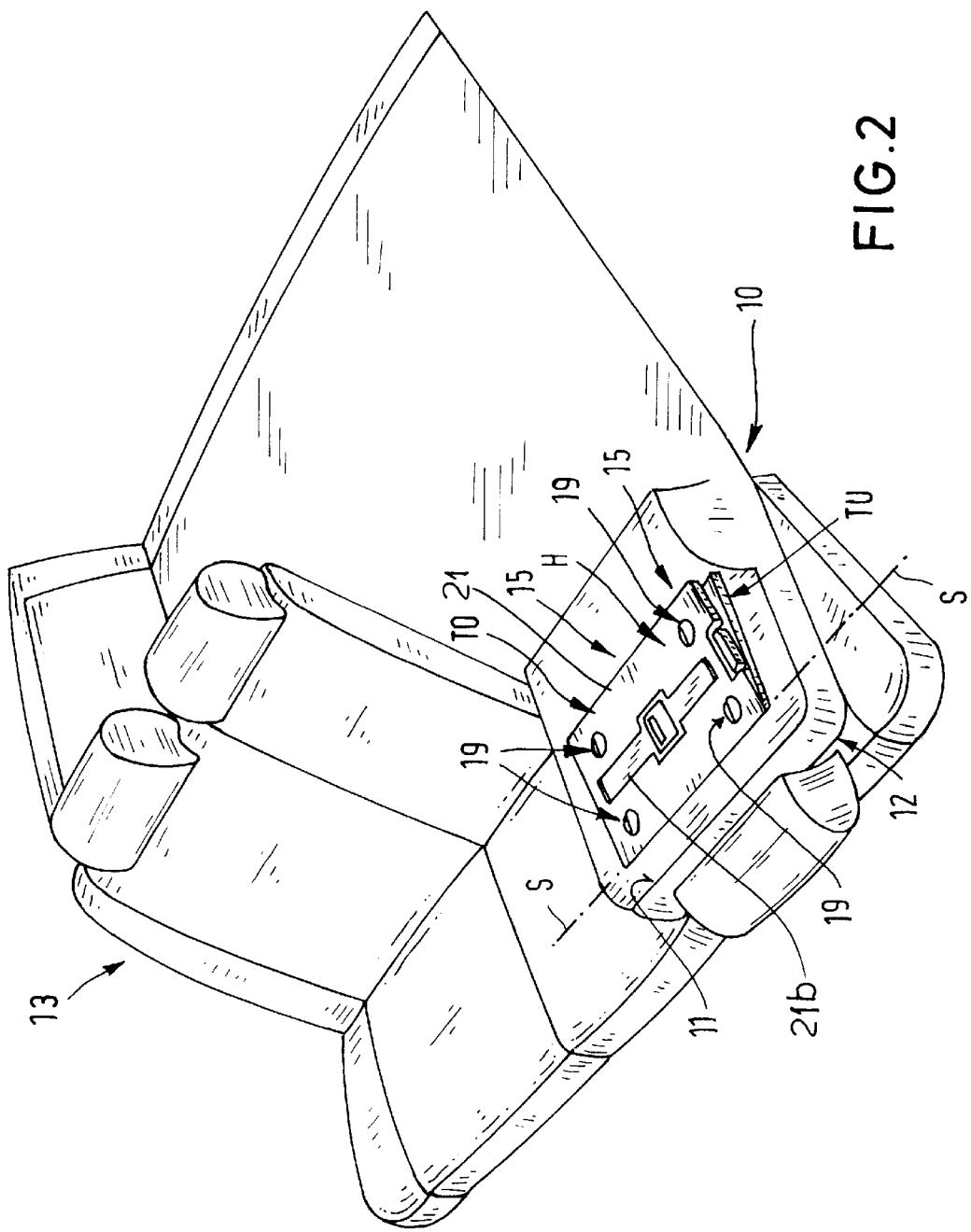
FIGS. 2, 3, 4, 5, and 6 are views of other systems in accordance with the invention.

The system of FIG. 2 has a retaining belt 21b usable to hold down elongated objects like skis or fishing rods and serving as the freight retainer secured to the plate 21. The plate 21 is formed as a pair of panels TO and TU hinged together at a front edge for relative pivoting about an axis S and unillustrated means at the rear edge for establishing a fixed spacing so that the outer face of the plate 21 will be horizontal or parallel to the floor 22.

Figure 4:
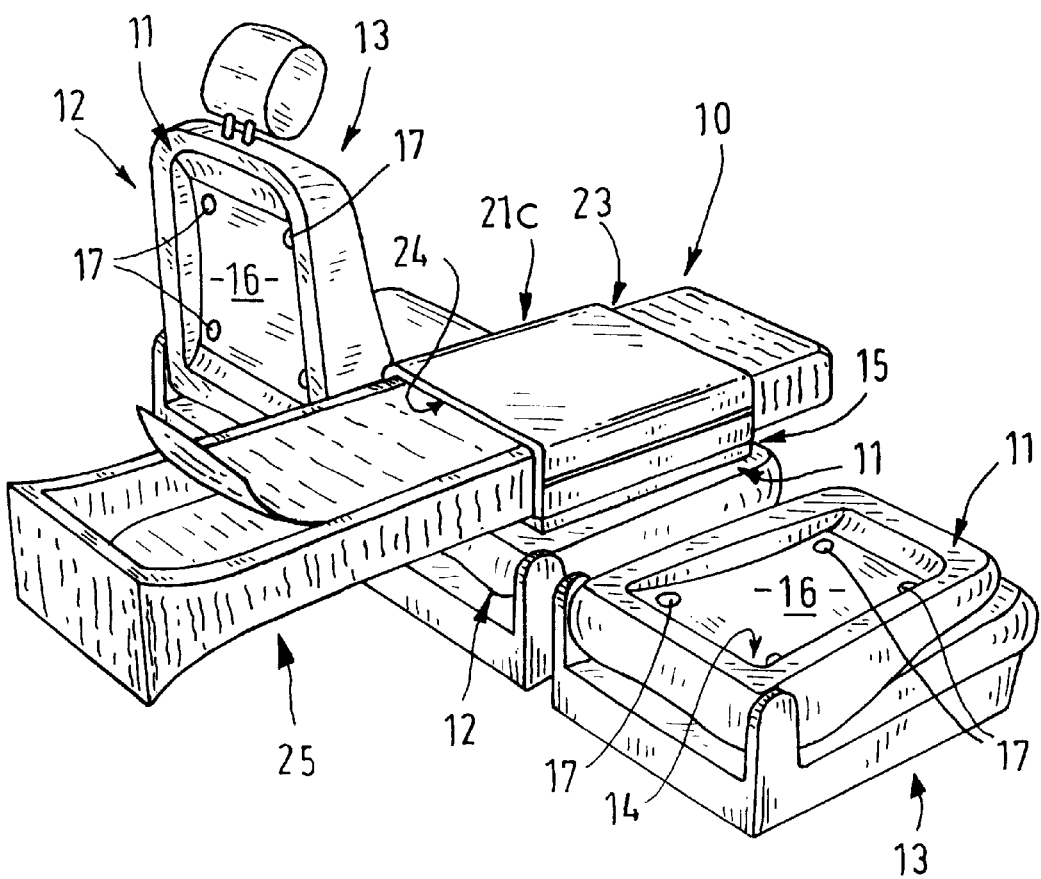

In FIG. 4 a box-like holder 21c with front and rear open ends 23 and 24 accommodates an elongated bag 25 that can serve to hold skis or the like.

Figure 5:
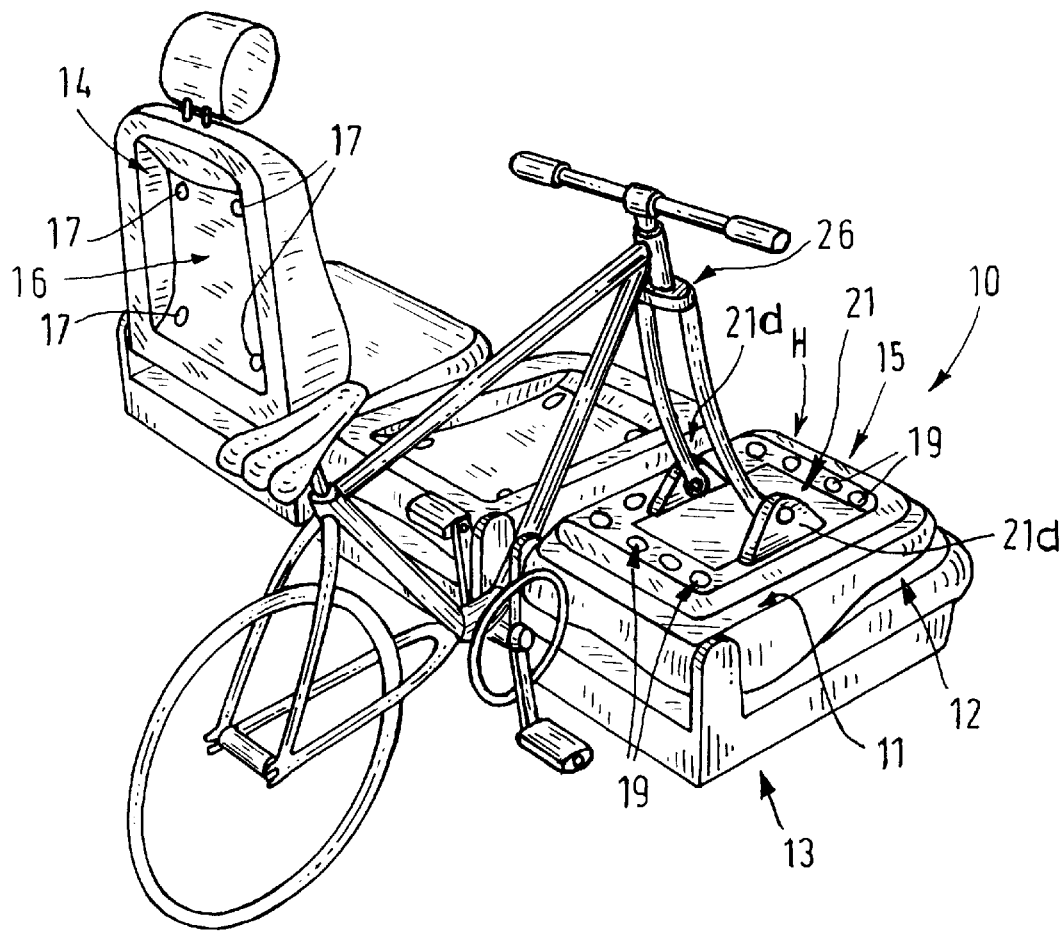

FIG. 5 shows a plate 21 formed with flanges 21d to which can be attached the front fork of a bicycle 26.

Figure 6:
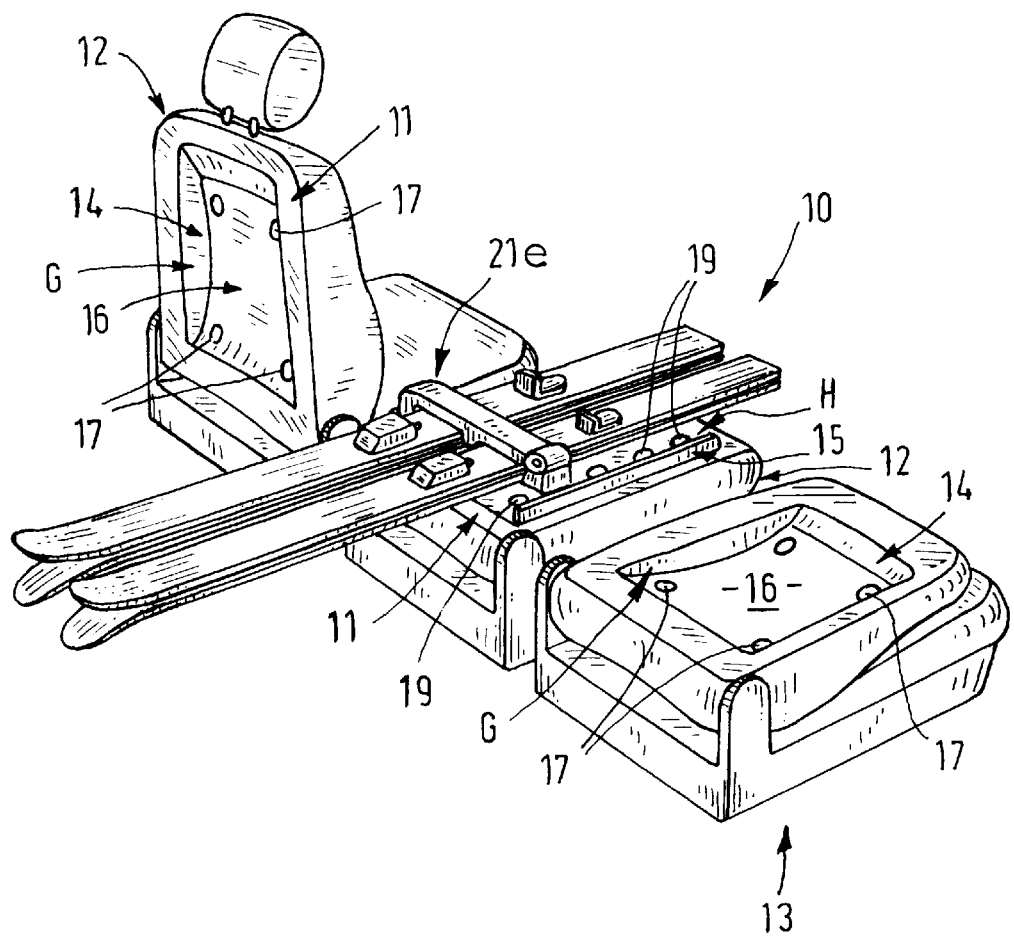

In FIG. 6 the plate 21 carries a clip 21e usable for holding skis. Both FIGS. 5 and 6 show how the formations 19 are spaced the same, e.g. 5 cm on center, as the formations 17 in the rear compartment 22. Thus any freight-holding device that could be mounted in the compartment 22 could also be mounted on a seat back 13 by means of the adapter or mounting plate 21.

FIGS. 7, 8 and 9 show a mounting plate 15 with four sleeve-type mounting formations 19 adapted to complementarily receive cylindrical mounting-formation pins 20 of the device plate 21. To prevent the pins 20 from pulling out of the sockets 19 except when wanted, these pins 20 are each formed with a circumferential and radially outwardly open notch or groove 27 engageable by a locking assembly 28 comprised of front and back engagement edges 29 and 30 that can project into the holes formed by the formations 17. These edges 29 and 30 are formed on the outer ends of slides 31 interconnected by a coupling bar 33 urged forward in direction a by springs 34 and having a handle B that can be depressed backward in direction c to move the edges 29 and 30 out of the formations 27 to release the pins 20 and allow the plate 21 to be removed from the plate 16. A similar locking assembly 28 can be provided to secure the plate 15 to the location G.

We claim:

1. In a motor vehicle having a freight compartment having a floor and a seat having a seat back with a rear seat-back surface movable between a vertical position and a horizontal position, a load-retaining system comprising:

respective arrays of mounting sockets on the floor and seat back, the sockets all being identically spaced within the respective arrays;

a mounting plate having a bottom face formed with a plurality of mounting pins engageable in the sockets and spaced identically to the sockets, the mounting plate having a top face formed with an array of mounting formations; and a freight-holding device having a lower face provided with an array of complementary formations fittable in the mounting formations in any of a plurality of different positions.

2. The load-retaining system defined in claim 1 wherein the floor array has a number of sockets that is substantially greater than a number of the pins on the bottom face of the plate.

3. The load-retaining system defined in claim 1 wherein the plate has a pair of hinged-together parts forming the respective bottom and top faces and pivotal relative to each other.

4. The load-retaining system defined in claim 1 wherein the seat back is formed with a recess having a base surface provided with the sockets of the seat-back array.

5. The load-retaining system defined in claim 1 wherein the mounting formations of the mounting plate are formed as cylindrical sockets and the mounting formations of the freight-holding device are formed as complementary cylindrical pins each formed with an outwardly open notch, the system further comprising retaining formations on the mounting plate laterally engageable in the notches to hold device in position on the plate.

6. The load-retaining system defined in claim 5 wherein the retaining formations are all coupled to a common locking assembly on the mounting plate for joint movement between locking positions engaged in the respective notches and freeing positions clear of the respective notches.

* * * * *